United States Patent
Yang et al.

(10) Patent No.: US 9,021,658 B1
(45) Date of Patent: May 5, 2015

(54) TRIGGER HINGE

(71) Applicant: Chin-Hsing Horng, Kueishan Hsiang, Taoyuan (TW)

(72) Inventors: Shih-Pin Yang, Taoyuan (TW); Bo-Lun Lin, Taoyuan (TW); Shun-Chin Su, Taoyuan (TW)

(73) Assignee: Chin-Hsing Horng, Taoyuan (TW)

( * ) Notice: Subject to any disclaimer, the term of this patent is extended or adjusted under 35 U.S.C. 154(b) by 0 days.

(21) Appl. No.: 14/101,333

(22) Filed: Dec. 9, 2013

(51) Int. Cl.
*E05D 7/00* (2006.01)
*H05K 5/02* (2006.01)

(52) U.S. Cl.
CPC .................... *H05K 5/0226* (2013.01)

(58) Field of Classification Search
CPC ............ E05D 3/12; E05D 3/06; E05D 3/10; G06F 1/1681; G06F 1/1616; G06F 1/1618; E05Y 2900/606; H04M 1/0216; H04M 1/0222; H04M 1/022; H05K 5/0226
USPC ........... 16/366, 368, 369, 340, 337, 334, 389, 16/357, 360, 361, 342, 330, 303; 361/679.6, 679.9, 679.17, 679.27; 248/917–923, 284.1; 379/433.12, 379/433.13; 455/575.1, 575.3, 575.4, 455/550.1, 90.3; 348/333.06, 373, 794
See application file for complete search history.

(56) References Cited

U.S. PATENT DOCUMENTS

| | | | |
|---|---|---|---|
| 2004/0212955 A1* | 10/2004 | Hsieh ........................... | 361/681 |
| 2005/0050686 A1* | 3/2005 | Kurokawa ...................... | 16/354 |
| 2007/0146984 A1* | 6/2007 | Lin ................................ | 361/683 |
| 2008/0109995 A1* | 5/2008 | Kuwajima et al. .............. | 16/354 |
| 2009/0000062 A1* | 1/2009 | Yamanami ...................... | 16/366 |
| 2010/0041448 A1* | 2/2010 | Gaddy et al. ................ | 455/575.3 |
| 2011/0289726 A1* | 12/2011 | Zhang et al. .................... | 16/250 |
| 2012/0192381 A1* | 8/2012 | Zhang et al. .................... | 16/366 |
| 2013/0111704 A1* | 5/2013 | Mitsui ............................. | 16/250 |
| 2013/0170108 A1* | 7/2013 | Lin ........................... | 361/679.01 |
| 2013/0318746 A1* | 12/2013 | Kuramochi .................... | 16/342 |
| 2014/0352113 A1* | 12/2014 | Chen et al. ..................... | 16/366 |
| 2015/0013107 A1* | 1/2015 | Shin et al. ...................... | 16/366 |

* cited by examiner

*Primary Examiner* — Chuck Mah

(57) ABSTRACT

A trigger hinge used in a mobile flip-up electronic device is disclosed to include a female shaft, a male shaft set mounted in the female shaft, and a trigger device mounted at the male shaft set. When the user opens or closes the mobile flip-up electronic device to rotate the male shaft set relative to the female shaft, a pushing and moving piece of the trigger device is moved forward or backward to switching on/off switch, and thereby booting up or shutting down the mobile flip-up electronic device. Thus, the invention enhances the application and convenience of use of mobile flip-up electronic devices.

3 Claims, 14 Drawing Sheets

TRIGGER HINGE

BACKGROUND OF THE INVENTION

1. Field of the Invention

The present invention relates to hinge technology, and more particularly, to trigger hinge for use in a flip-up electronic device to let the cover member and base member of the flip-up electronic device to be biased relative to each other and to provide a trigger function.

2. Description of the Related Art

Hinges are widely used in mobile flip-up electronic devices such as notebooks, smart phones, and etc. to pivotally connect a base member and a cover member together, allowing only a limited angle of rotation between them. However, conventional hinges for mobile flip-up electronic device simply allow two joined members to be turned relative to each other without providing any trigger function to start up the mobile flip-up electronic device.

SUMMARY OF THE INVENTION

The present invention has been accomplished under the circumstances in view. It is the main object of the present invention to provide a trigger hinge for use in a mobile flip-up electronic device, which is capable of providing a trigger function to start up the mobile flip-up electronic device.

To achieve this and other objects of the present invention, a trigger hinge of the invention includes a female shaft, a first male shaft and a second male shaft pivotally mounted in the female shaft, and a trigger device including a rotating member that is pivotally coupled to the second male shaft, a linkage member and a pushing and moving member. During rotation of the first male shaft of the male shaft set, a first push block is moved toward or away from the rotating member, driving the linkage member to move the pushing and moving piece forward or backward in switching on or off the mobile flip-up electronic device in which the trigger hinge is used.

DETAILED DESCRIPTION OF THE PREFERRED EMBODIMENT

Figure 1:
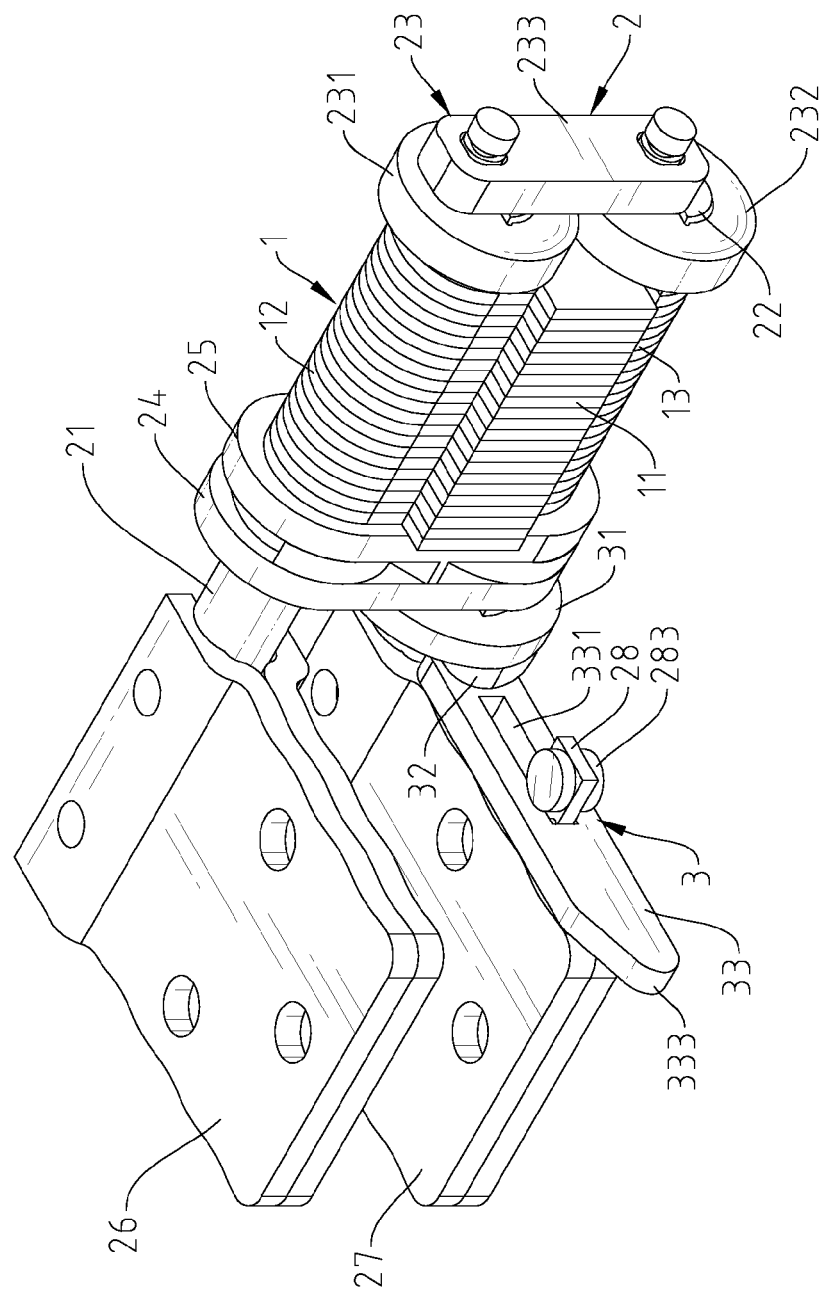
FIG. 1 is an oblique elevational view of a trigger hinge in accordance with the present invention.
Figure 2:
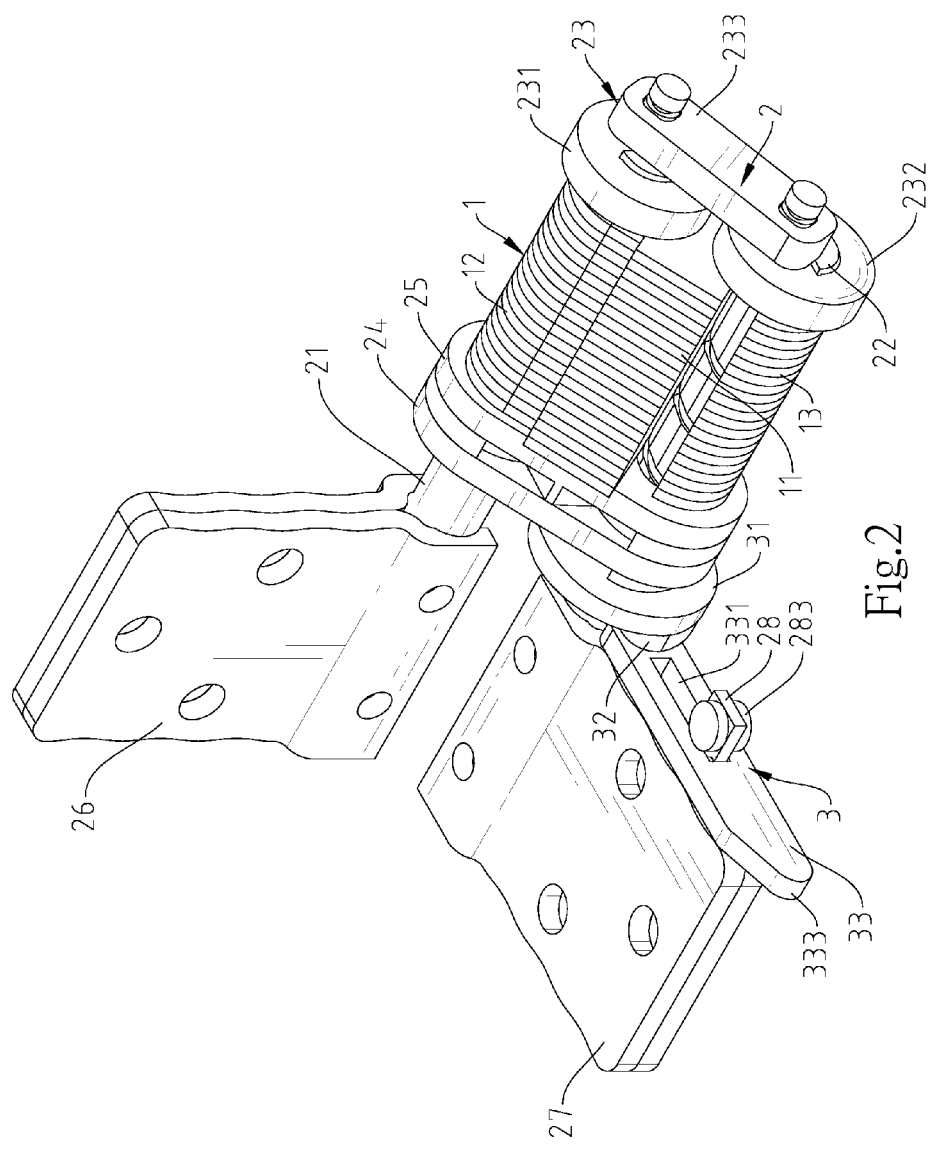
FIG. 2 corresponds to FIG. 1, illustrating the first connection member and the second connection member moved away from each other.
Figure 3:
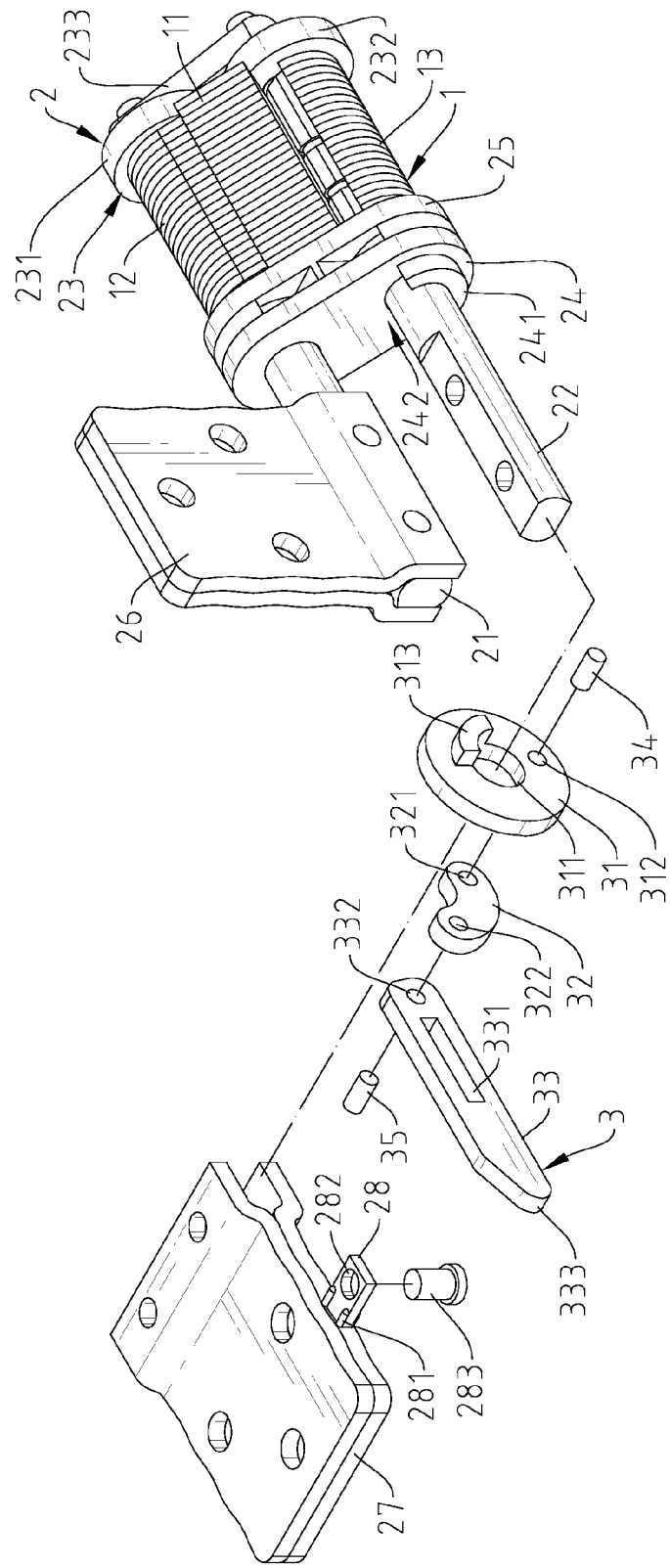
FIG. 3 is an exploded view of the trigger hinge in accordance with the present invention.

Referring to FIGS. 1-3, a trigger hinge in accordance with the present invention is shown. The trigger hinge comprises a female shaft 1, a male shaft set 2, and a trigger 3.

The female shaft 1 comprises a shaft body 11 defining a first barrel 12 and a second barrel 13 in a parallel manner.

The male shaft set 2 comprises a first male shaft 21, a second male shaft 22, a transmission mechanism 23, a first positioning member 24, a second transmission member 25, a first connection member 26, and a second connection member 27.

The first male shaft 21 and the second male shaft 22 are respectively inserted through the first barrel 12 and second barrel 13 of the female shaft 1. The transmission mechanism 23 comprises a first transmission member 231, a second transmission member 232, and a link 233. The first transmission member 231 is fixedly connected to the first male shaft 21. The second transmission member 232 is fixedly connected to the second male shaft 22. The link 233 has two opposite ends thereof respectively pivotally connected to the first transmission member 231 and the second transmission member 232. The pivoted point between the link 233 and the first transmission member 231 is at an eccentric location relative to the axial center of the first transmission member 231. The pivoted point between the link 233 and the second transmission member 232 is at an eccentric location relative to the axial center of the second transmission member 232. The first positioning member 24 comprises a first push block 241 disposed adjacent to the second male shaft 22 and defining a connection space 242. The first positioning member 24 and the second positioning member 25 are respectively pivotally connected to the first male shaft 21 and the second male shaft 22. The first connection member 26 and the second connection member 27 are respectively fixedly connected to the first male shaft 21 and the second male shaft 22. The second connection member 27 comprises a limiter plate 28 extended from one side thereof and defining a plurality of ribs 281 and a through hole 282, and a stop rod 283 mounted in the through hole 282.

Figure 14:
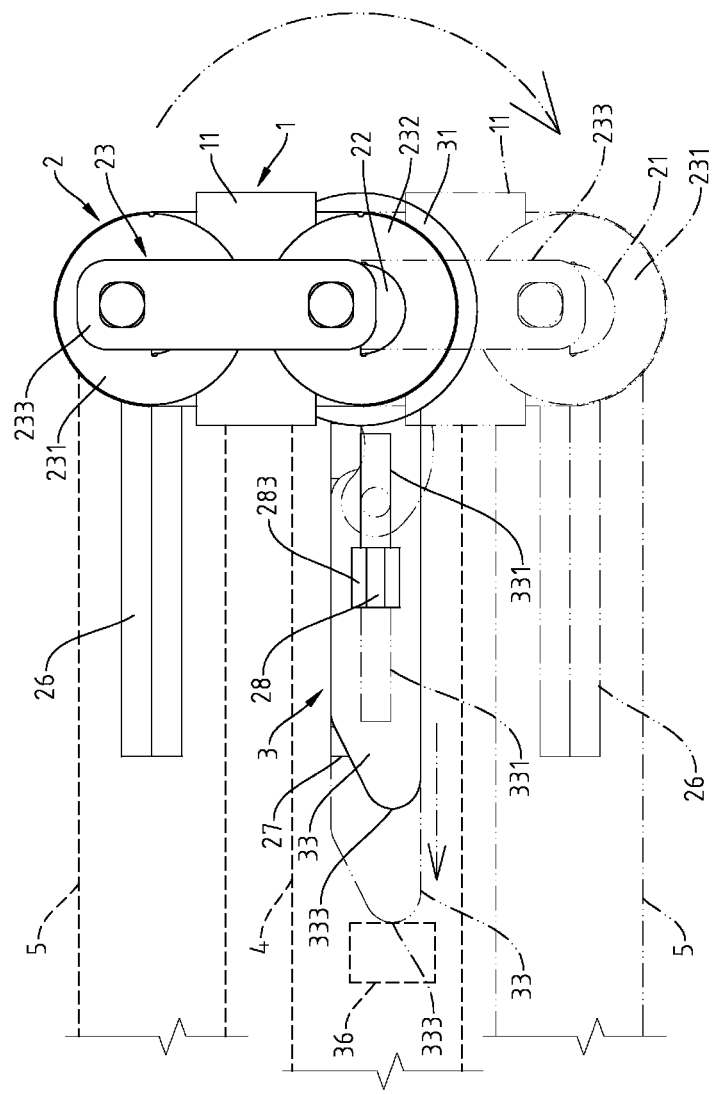
FIG. 14 is a schematic applied view of the present invention, illustrating the trigger hinge used in a mobile flip-up electronic device.

Referring to FIG. 14 and FIGS. 1-3 again, the trigger device 3 comprises a rotating member 31, a linkage member 32, a pushing and moving member 33, a first pivot pin 34, a second pivot pin 35, and a switch 36. The rotating member 31 comprises a center axle hole 311 located at the center thereof, a first pivot hole 312 disposed at an eccentric location, and a second push block 313 protruded from one side thereof around a part of the center axle hole 311. The center axle hole 311 of the rotating member 31 is pivotally coupled to the second male shaft 22 of the male shaft set 2 to insert the second push block 313 into the connection space 242 so that the second push block 313 and the rotating member 31 can be rotated by the first push block 241. The linkage member 32 comprises a first through hole 321 and a second through hole 322 respectively disposed near two opposite ends thereof. The first pivot pin 24 has two opposite ends thereof respectively pivotally connected to the first pivot hole 312 and the first through hole 321. The pushing and moving member 33 comprises a triggering tip 333 located at one end thereof, a second pivot hole 332 located at an opposite end thereof, and a longitudinal sliding slot 331 spaced between the triggering tip 333 and the second pivot hole 332. The second pivot pin 35 has two opposite ends thereof respectively pivotally connected to the second pivot hole 332 and the second through hole 322. The longitudinal sliding slot 331 is coupled to the stop rod 283 at the limiter plate 28 of the second connection member 27. The stop rod 283 in this embodiment is a rivet. After the longitudinal sliding slot 331 of the pushing and moving member 33 is coupled to the stop rod 283, the plain end of the stop rod 283 is hammered down, preventing disconnection of the pushing and moving member 33 from the limiter plate 28 of the second connection member 27. Further, as shown in FIG. 14, the switch 36 is disposed at an outer side relative to the triggering tip 333 of the pushing and moving piece 33. The switch 36 can be a photoelectric switch, solenoid switch, induction switch or mechanical switch.

Figure 4:
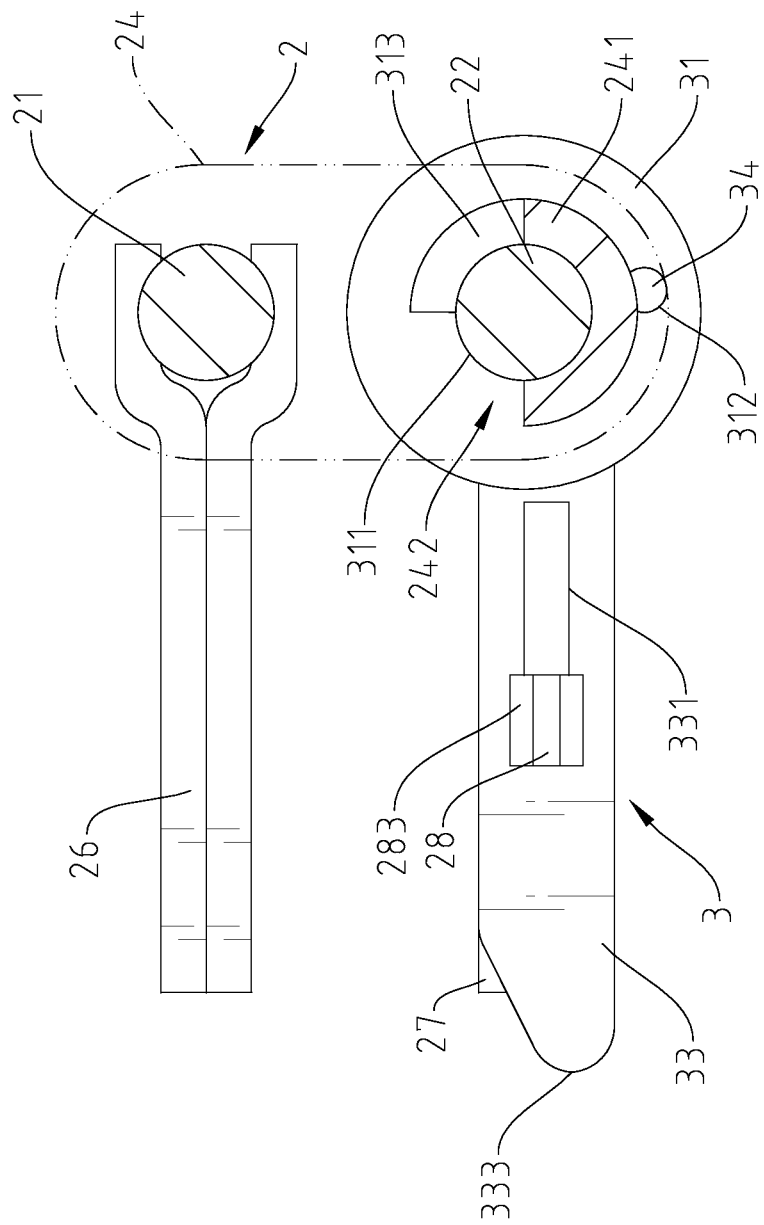
FIG. 4 is a schematic drawing of the present invention, illustrating the trigger hinge in the initial position.

Referring to FIGS. 4-8, the first connection member 26 is movable from an initial position of 0° angle shown in FIG. 4. When the first connection member 26 is forced away from initial position, it drives the first male shaft 21 to rotate the first transmission member 231. Because the pivoted point between the link 233 and the first transmission member 231 is at an eccentric location relative to the axial center of the first transmission member 231 and the pivoted point between the link 233 and the second transmission member 232 is at an eccentric location relative to the axial center of the second transmission member 232, the first transmission member 231 will be moved around the second transmission member 232 at this time.

Figure 5:
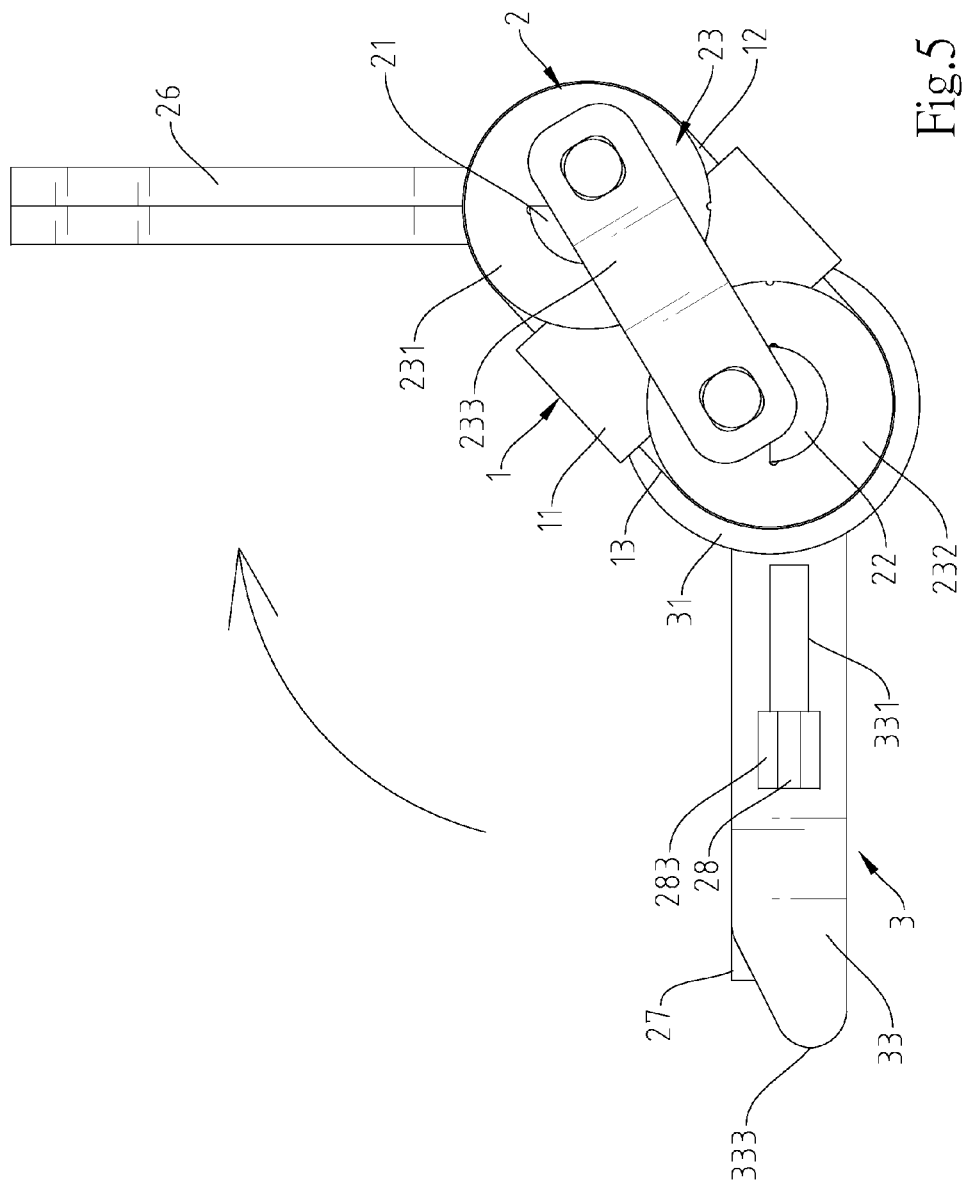
FIG. 5 is a schematic side view of the present invention, illustrating the trigger hinge moved to a first angular position.
Figure 6:
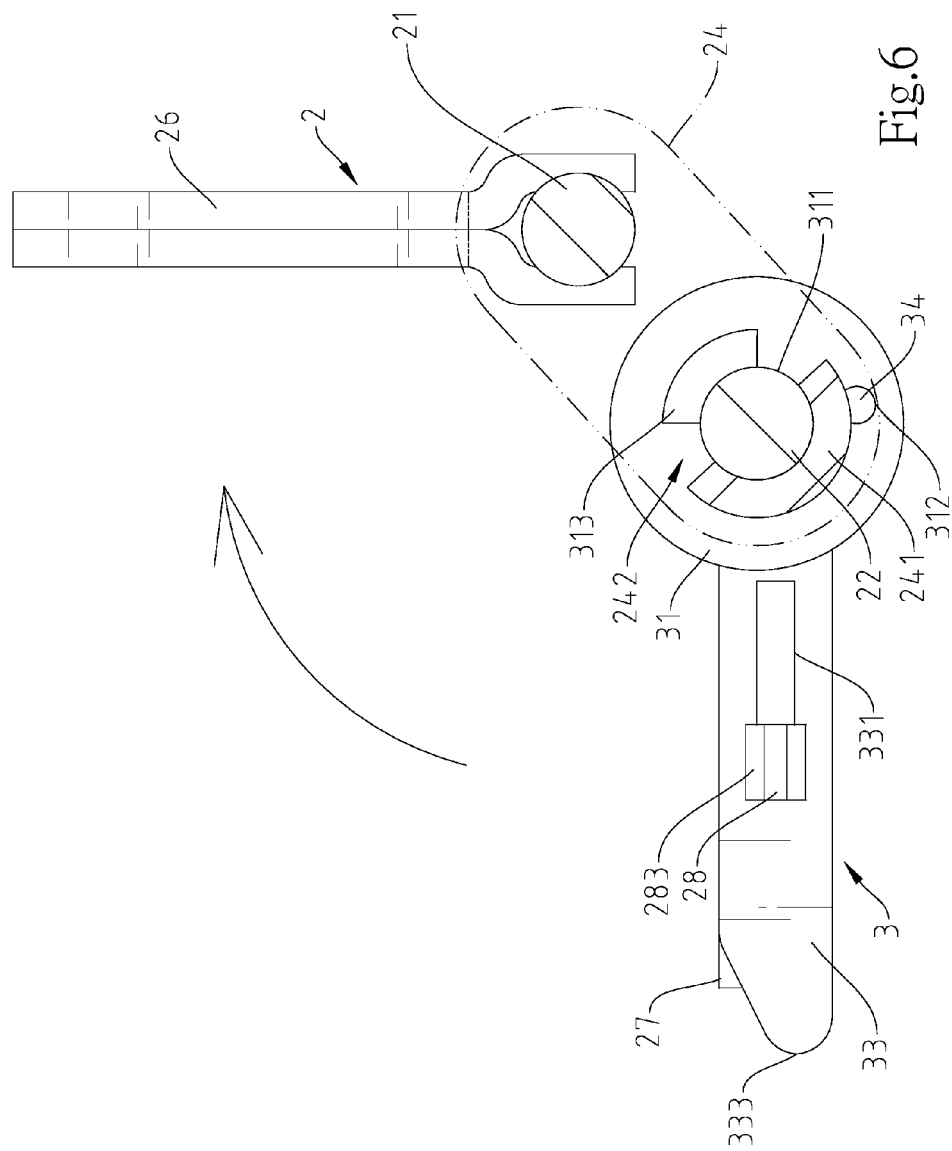
FIG. 6 is a schematic operational plain view, illustrating the trigger hinge moved to the first angular position.
Figure 7:
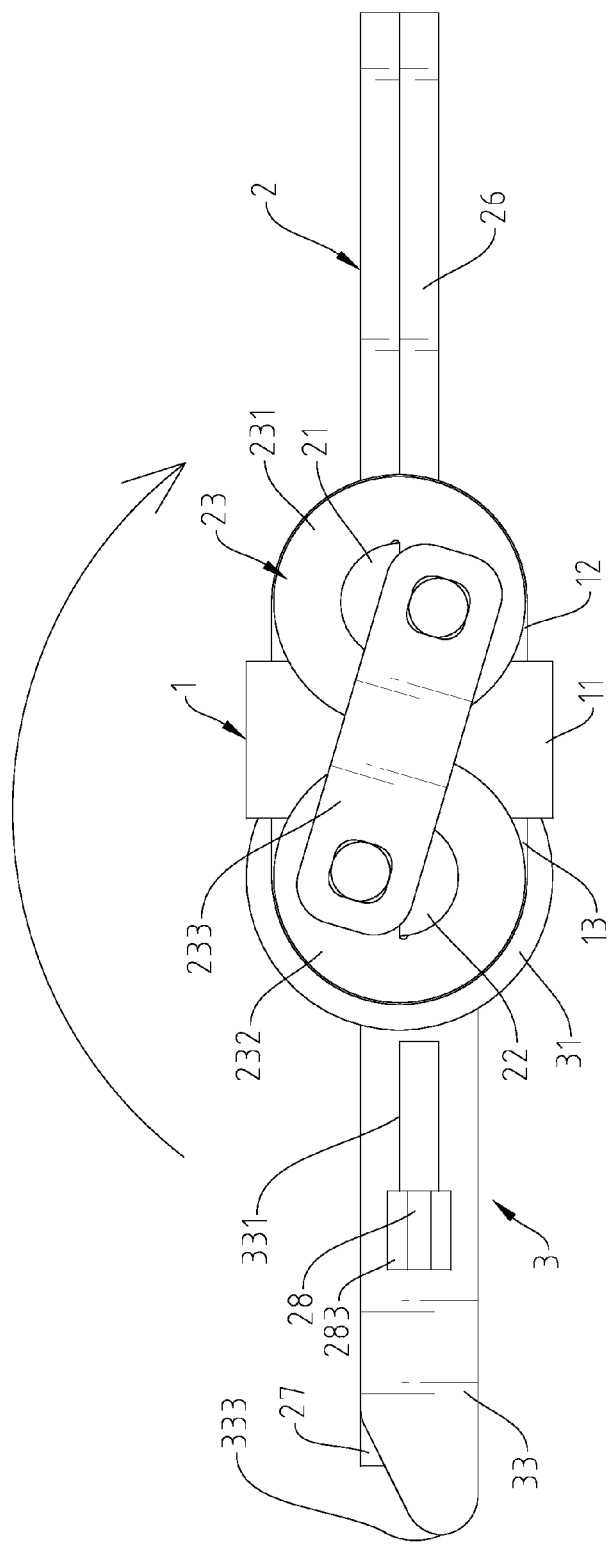
FIG. 7 is a schematic side view of the present invention, illustrating the trigger hinge moved to a second angular position.
Figure 8:
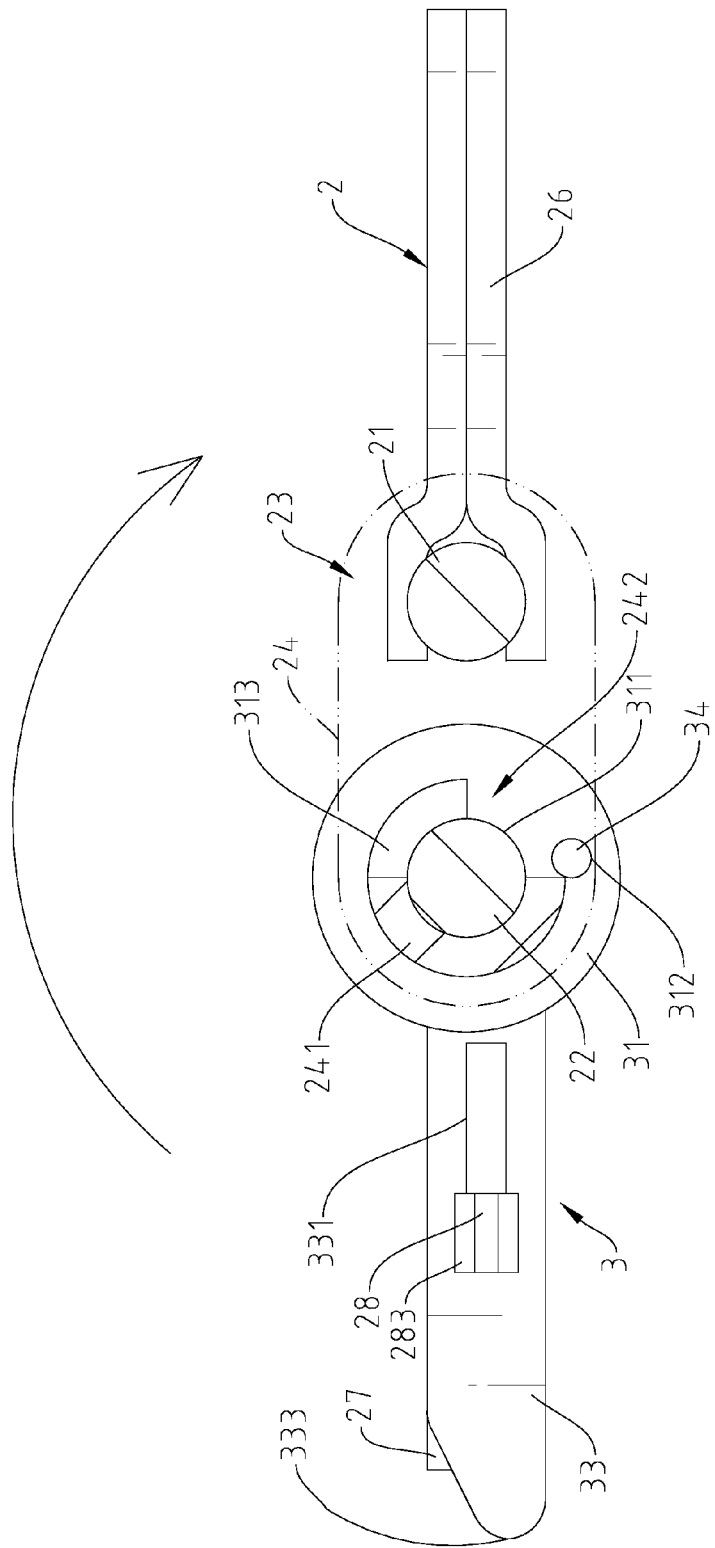
FIG. 8 is a schematic operational plain view, illustrating the trigger hinge moved to the second angular position.

During movement of the first transmission member 231 around the second transmission member 232, the first push block 241 of the first positioning member 24 is rotated, as shown in FIGS. 5 and 6. When the first connection member 26 is rotated to 90° angle, there is still a gap left between the first push block 241 and the second push block 313. As shown in FIGS. 7 and 8, when the first connection member 26 is rotated to 180° angle, the first push block 241 of the first positioning member 24 touches the second push block 313.

Figure 9:
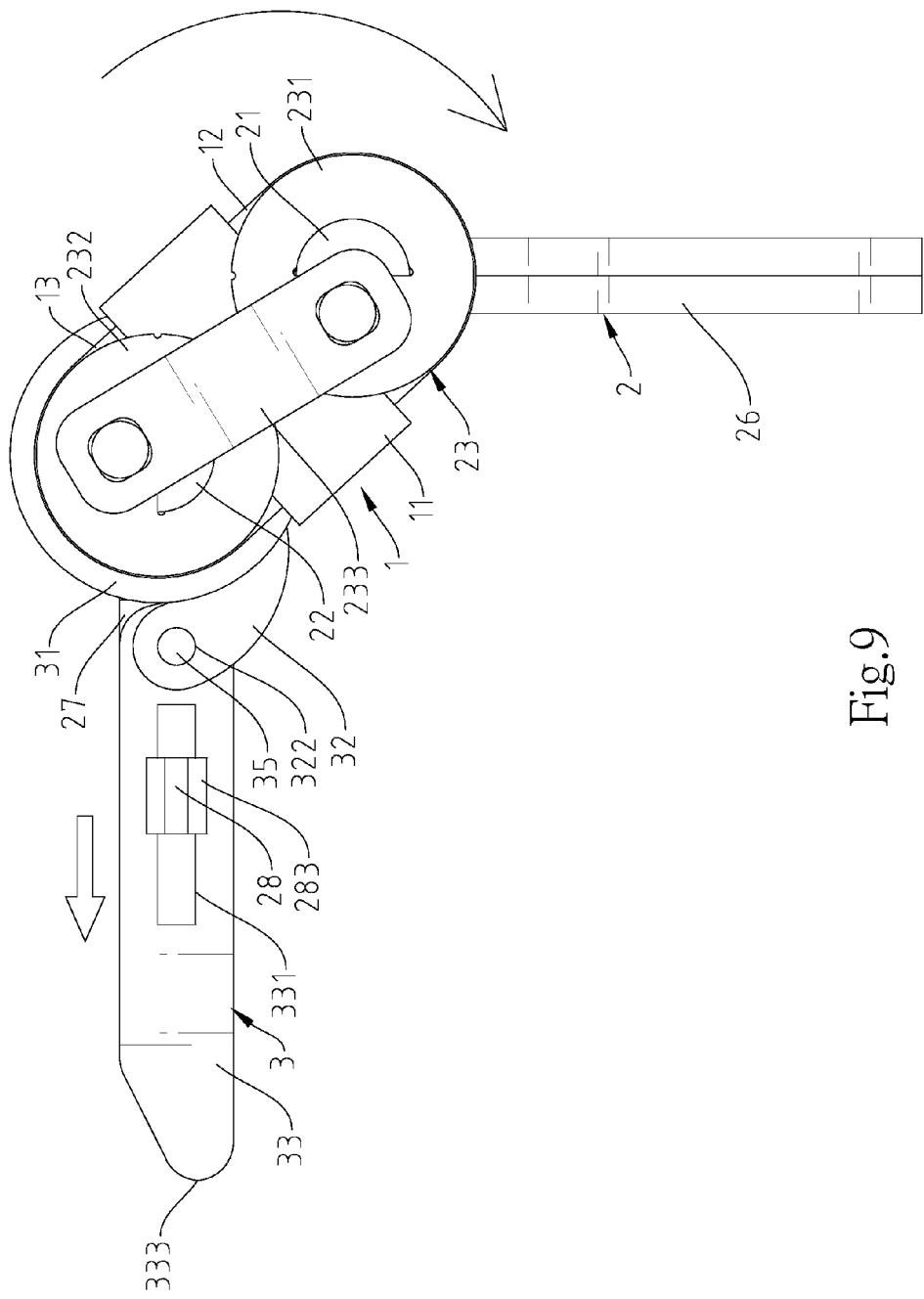
FIG. 9 is a schematic side view of the present invention, illustrating the trigger hinge moved to a third angular position.
Figure 10:
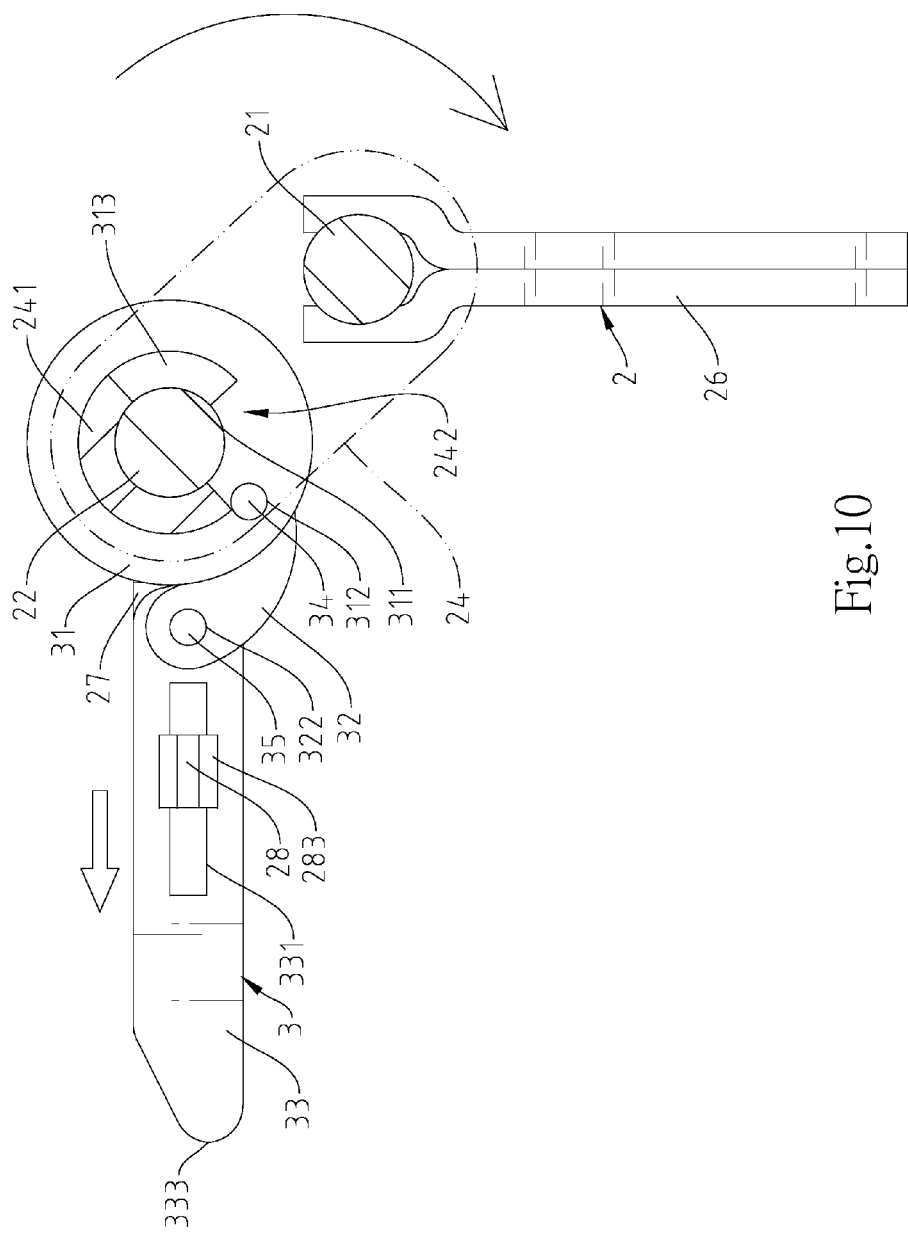
FIG. 10 is a schematic operational plain view, illustrating the trigger hinge moved to the third angular position.

Referring to FIGS. 9 and 10, and FIG. 14 again, when the first connection member 26 is rotated to 270° angle, the first push block 241 of the first positioning member 24 pushes the second push block 313 of the trigger device 3 to move, causing rotation of the rotating member 31 to move said linkage member 32. At this time, the pivoted point between the linkage member 32 and the pushing and moving piece 33 is moved away from the axial center of the rotating member 31, causing the pushing and moving piece 33 to be moved forward along the track defined by the limiter plate 28 and the longitudinal sliding slot 331. During forward movement of the pushing and moving piece 33, the triggering tip 333 of the pushing and moving piece 33 will be forced to touch the switch 36, thereby switching on the switch 36. On the contrary, when the pushing and moving piece 33 is moved backward, the triggering tip 333 is moved away from the switch 36, thereby switching off the switch 36.

Figure 11:
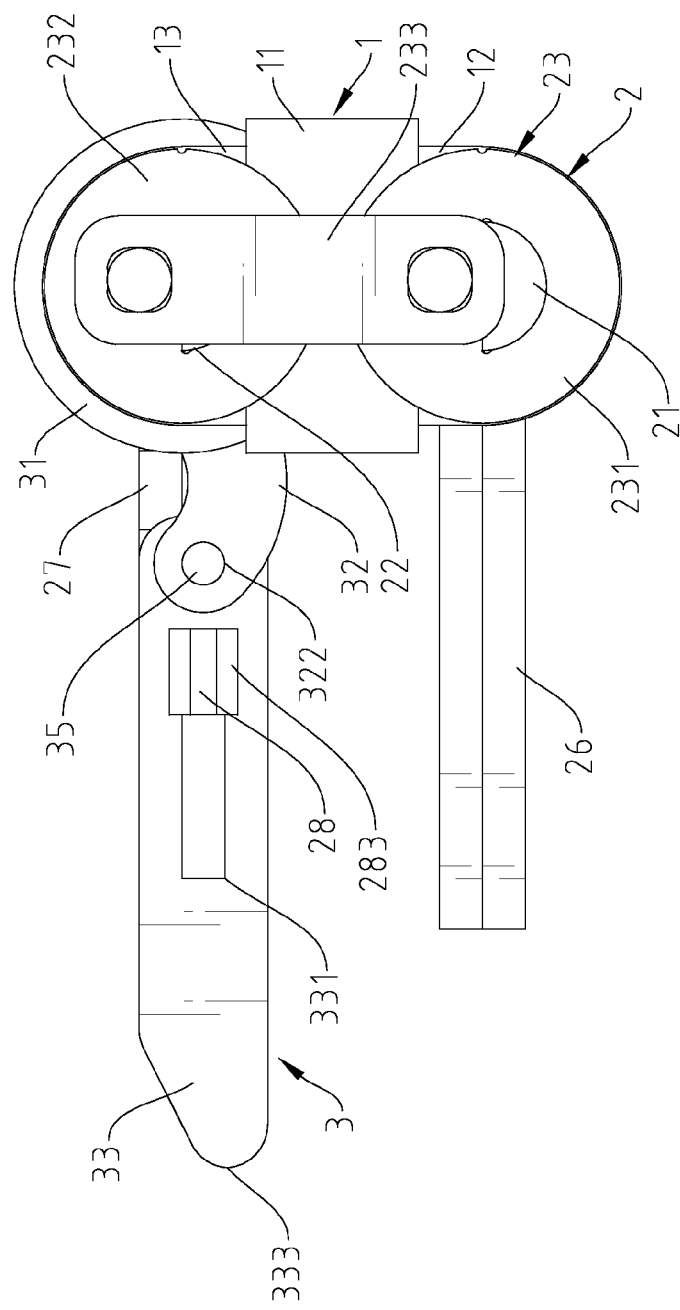
FIG. 11 is a schematic side view of the present invention, illustrating the trigger hinge moved to a fourth angular position.
Figure 12:
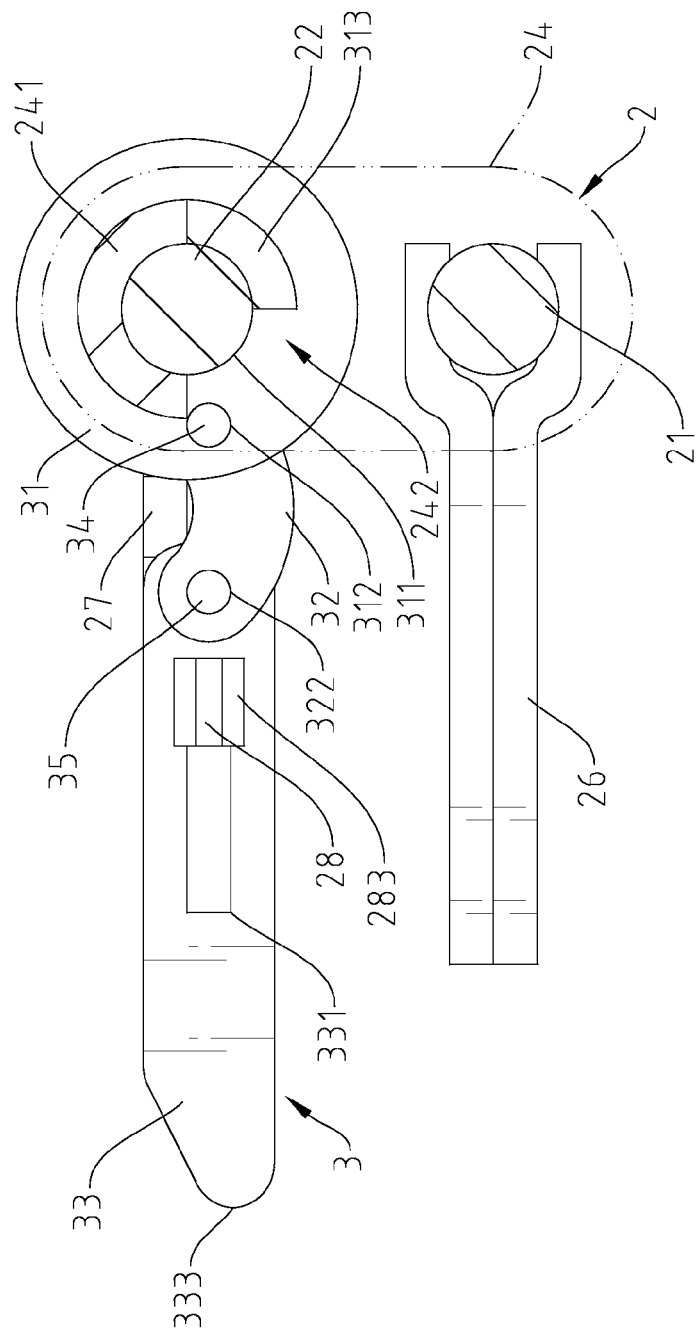
FIG. 12 is a schematic operational plain view, illustrating the trigger hinge moved to the fourth angular position.
Figure 13:
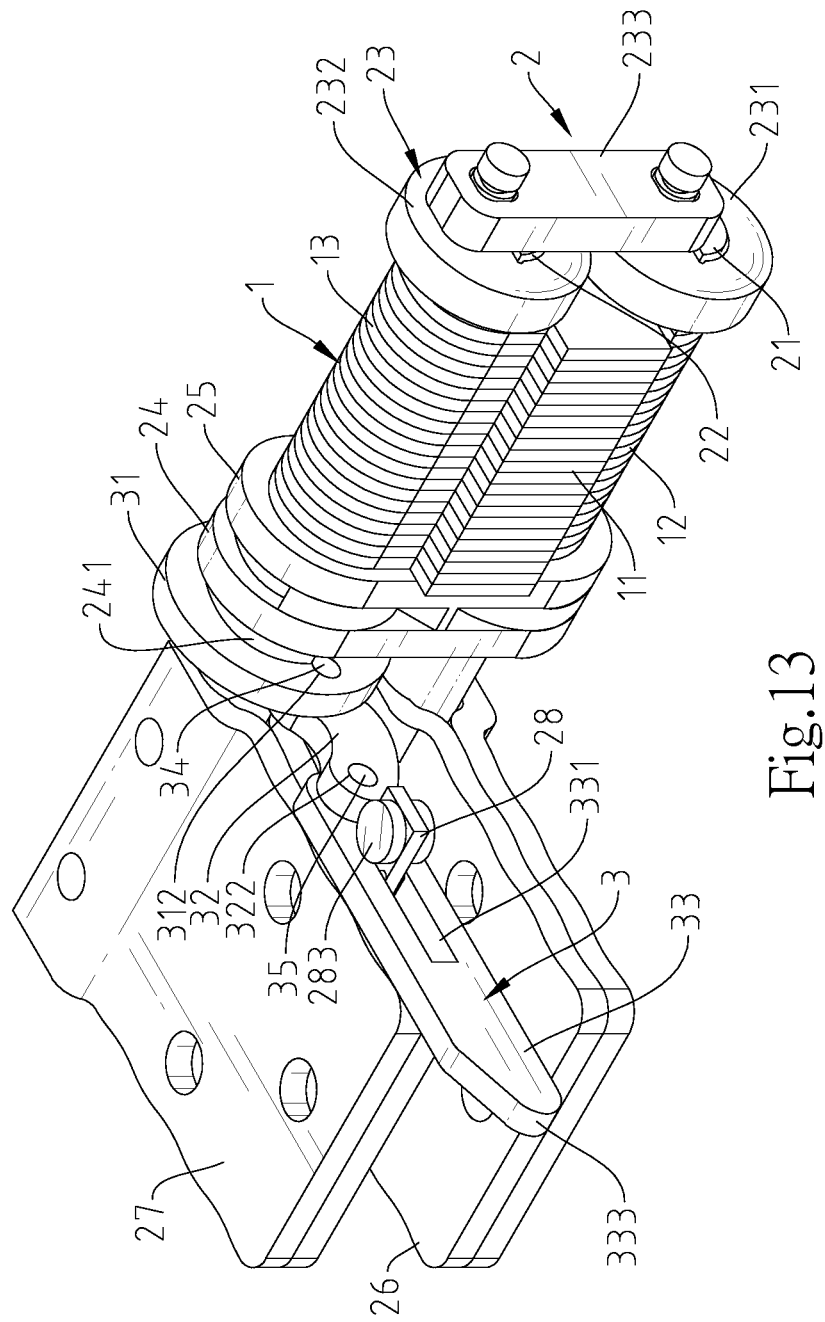
FIG. 13 is an oblique top elevational view of the present invention, illustrating the trigger hinge in the fourth angular position.

Referring to FIGS. 11-13, when the first connection member 26 is rotated to 360° angle, the two pivoted ends of the linkage member 32 and the axial center of the second male shaft are almost kept on the same plane, and the pushing and moving piece 33 is extended out to the extent. On the contrary, when the first connection member 26 is turned in the reversed direction from 360° angle back to 0° angle, the first push block 241 pushes the second push block 313 to turn backwards, causing the linkage member 32 back to its former position, and thus the pushing and moving piece 33 is retracted.

Referring to FIGS. 2, 3 and 13 again, the ribs 281 of the limiter plate 28 of the male shaft set 2 are designed to minimize the contact area between the limiter plate 28 and the pushing and moving piece 33, reducing the friction and enabling the pushing and moving piece 33 to be moved along the track defined by the longitudinal sliding slot 331 and the limiter plate 28 smoothly and stably without causing much friction.

Referring to FIG. 14, the trigger hinge is shown used in a mobile flip-up electronic device comprising a cover member 5 having a display screen mounted therein and a base member 4 pivotally connected to the cover member 5 by the trigger hinge. The cover member 5 and the base member 4 are respectively connected to the first male shaft 21 and the second male shaft 22. When the cover member 5 is turned from the close position at the top side of the base member 4 to the bottom side of the base member 4, the pushing and moving piece 33 of the trigger device 3 is moved forward along the longitudinal sliding slot 331 by the male shaft set 1 to trigger the switch 36 in the base member 4, thereby causing the mobile flip-up electronic device to boot up. On the contrary, when the cover member 5 is turned from the bottom side of the base member 4 to the top side thereof, the pushing and moving piece 33 of the trigger device 3 is moved backwardly along the longitudinal sliding slot 331 by the male shaft set 1 in direction away from away from the switch 36, thereby causing the switch 36 to switch off the mobile flip-up electronic device.

In actual application, the trigger hinge can be used to switch on or off a connection port, keyboard, voice device or video device of a tablet computer or any of a variety of other mobile flip-up electronic devices. For example, the trigger hinge can be moved to trigger the switch 36, thereby starting up a voice device or video device, or retracting a keyboard to the inside of the base member 4, or moving a connection port out of the base member 4.

In conclusion, the key technology of the present invention is to let the male shaft set 2 move the first push block 241 of the first positioning member 24 toward or away from the second push block 313 of the rotating member 31 during movement of the trigger device 3 with the male shaft set 2, thereby driving the pushing and moving piece 33 of the trigger device 3 to switch on or off the switch 36.

What the invention claimed is:

1. A trigger hinge, comprising a female shaft, a male shaft set and a trigger device, wherein:
said female shaft comprises a shaft body defining a first barrel and a second barrel in a parallel manner;
said male shaft set comprising a first male shaft, a second male shaft, a transmission mechanism, a first positioning member providing a first push block, a first connection member, a second connection member and a switch, said first male shaft and said second male shaft being respectively inserted through said first barrel and said second barrel of said female shaft, said transmission mechanism and said first positioning member being respectively pivotally connected to said first male shaft and said second male shaft, said first positioning member comprising a first push block disposed adjacent to said second male shaft and defining a connection space, said first connection member being fixedly connected to said first male shaft, said second connection member being fixedly connected to said second male shaft, said second connection member comprising a limiter plate;

said trigger device comprises a rotating member, a linkage member and a pushing and moving piece, said rotating member being pivotally coupled with the center thereof to said second male shaft, said rotating member comprising a second push block inserted into said connection space of said first positioning member, said linkage member having two opposite ends thereof respectively pivotally connected to said rotating member and said pushing and moving piece, said pushing and moving piece comprising a triggering tip located at one end thereof and adapted for switching a switch and a longitudinal sliding slot coupled to said limiter plate of said second connection member;

said first push block of said first positioning member is moved toward or away from said second push block of said rotating member during relative motion between said female shaft and said male shaft set, thereby driving said pushing and movable piece to move along a track defined by said limiter plate and said longitudinal slot in switching on or off said switch.

2. The trigger hinge as claimed in claim 1, wherein said rotating member defines a first pivot hole; said pushing and moving piece defines a second pivot hole; said linkage member defines a first through hole and a second through hole; said trigger device further comprises a first pivot pin pivotally connected between said first pivot hole and said first through hole, and second pivot pin pivotally connected between said second pivot hole and said second through hole.

3. The trigger hinge as claimed in claim 1, wherein said transmission mechanism of said male shaft set comprises a first transmission member fixedly connected to said first male shaft, a second transmission member fixedly connected to said second male shaft, and a link pivotally connected between said first transmission member and said second transmission member, the pivoted point between said link and said first transmission member being at an eccentric location relative to the axial center of said first transmission member, the pivoted point between said link and said second transmission member being at an eccentric location relative to the axial center of said second transmission member.

* * * * *